(12) United States Patent
Prause

(10) Patent No.: US 7,731,446 B2
(45) Date of Patent: Jun. 8, 2010

(54) ARTICULATED JOINT

(75) Inventor: Markus Prause, Coburg (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 10/548,676

(22) PCT Filed: Feb. 27, 2004

(86) PCT No.: PCT/DE2004/000419

§ 371 (c)(1),
(2), (4) Date: Jul. 13, 2006

(87) PCT Pub. No.: WO2004/081397

PCT Pub. Date: Sep. 23, 2004

(65) Prior Publication Data

US 2006/0251470 A1 Nov. 9, 2006

(30) Foreign Application Priority Data

Mar. 11, 2003 (DE) ................................. 103 11 679

(51) Int. Cl.
*F16B 2/22* (2006.01)
(52) U.S. Cl. ..................... 403/372; 403/164; 403/203; 411/521; 411/526
(58) Field of Classification Search ................ 403/164, 403/165, 202, 203, 365, 366, 372; 411/520, 411/521, 525, 526; 384/280, 281; 16/2.1
See application file for complete search history.

(56) References Cited

U.S. PATENT DOCUMENTS 2,275,058 A * 3/1942 Draving ....................... 411/521
2,884,283 A * 4/1959 Korol et al. .................. 384/439

(Continued)

FOREIGN PATENT DOCUMENTS

CH          435 871          5/1967

(Continued)

OTHER PUBLICATIONS

International Search Report dated Aug. 9, 2004 for corresponding PCT/DE2004/000419.

(Continued)

*Primary Examiner*—Michael P Ferguson
(74) *Attorney, Agent, or Firm*—Christie, Parker & Hale, LLP

(57) ABSTRACT

A joint includes at least one joint bushing and a joint bolt or pipe that is rotatably mounted with radial play in the joint bushing, forming an annular bearing gap. The joint has a play compensation element having several spring-loaded sections that engage in the annular bearing gap. The radii of the spring-loaded sections are shorter than the radius of the annular bearing gap. The spring-loaded sections project beyond a base body of the play compensation element at an acute angle to the joint axis. If the play compensation element is designed both to compensate the play and to axially secure the joint, it includes at least one clamping section, which is/are supported on the joint bolt and project(s) beyond the opposite side of the base body of the play compensation element to the spring-loaded sections. The play compensation element can be used in particular for joints of adjusting devices in motor vehicles.

10 Claims, 6 Drawing Sheets

U.S. PATENT DOCUMENTS

| | | | | |
|---|---|---|---|---|
| 2,986,060 A | * | 5/1961 | Lifka | 411/521 |
| 3,007,726 A | * | 11/1961 | Parkin | 403/372 |
| 3,203,302 A | * | 8/1965 | Frederick | 411/520 |
| 3,561,792 A | | 2/1971 | Cycowicz | |
| 3,829,184 A | * | 8/1974 | Chevret | 384/280 |
| 3,966,276 A | * | 6/1976 | Bellarbre et al. | 384/215 |
| 4,240,677 A | * | 12/1980 | Payne et al. | 384/252 |
| 4,323,727 A | * | 4/1982 | Berg | 174/135 |
| 4,775,273 A | | 10/1988 | Bauer | |
| 5,609,421 A | | 3/1997 | Schulze-Eyssing et al. | |
| 5,664,888 A | | 9/1997 | Sabin | |
| 5,735,631 A | * | 4/1998 | Patzelt et al. | 403/371 |
| 6,361,261 B1 | * | 3/2002 | Gattone et al. | 411/526 |
| 6,669,370 B1 | | 12/2003 | Storch et al. | |
| 6,755,571 B2 | | 6/2004 | Kajiyama | |
| 2002/0125049 A1 | | 9/2002 | Kajiyama | |

FOREIGN PATENT DOCUMENTS

| | | |
|---|---|---|
| CH | 435 871 A | 5/1967 |
| DE | 42 13 831 A1 | 11/1993 |
| DE | 195 31 278 C1 | 1/1997 |
| DE | 196 27 288 A1 | 1/1997 |
| DE | 199 45 371 A1 | 4/2001 |
| JP | H01-141918 U | 9/1989 |
| JP | 2002-303315 A | 10/2002 |

OTHER PUBLICATIONS

International Preliminary Examination Report dated Feb. 14, 2005 for corresponding PCT/DE2004/000419.
English Patent Abstract of DE 195 31 278 dated Jan. 30, 1997.
English Patent Abstract of DE 199 45 371 dated Apr. 26, 2001.
Japan Office action for Patent Application No. 2006-504249, Office action mailed Oct. 27, 2009, English translation (2 pgs.).

* cited by examiner

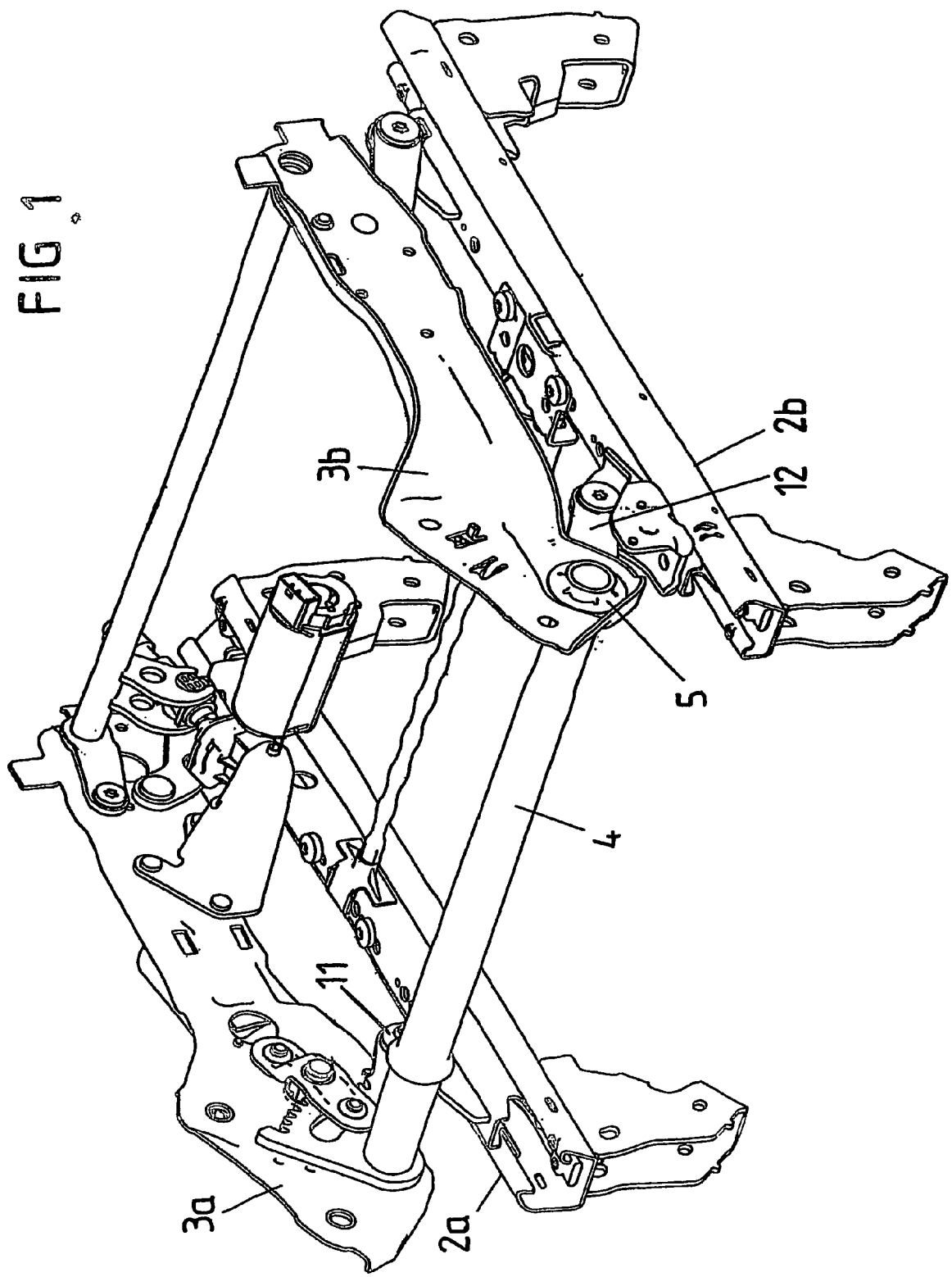

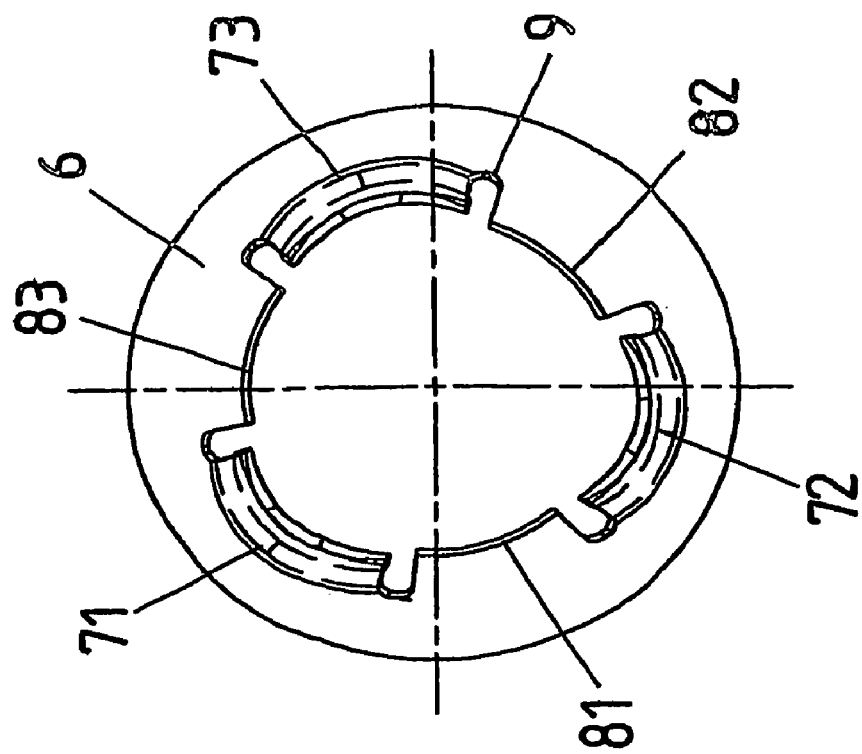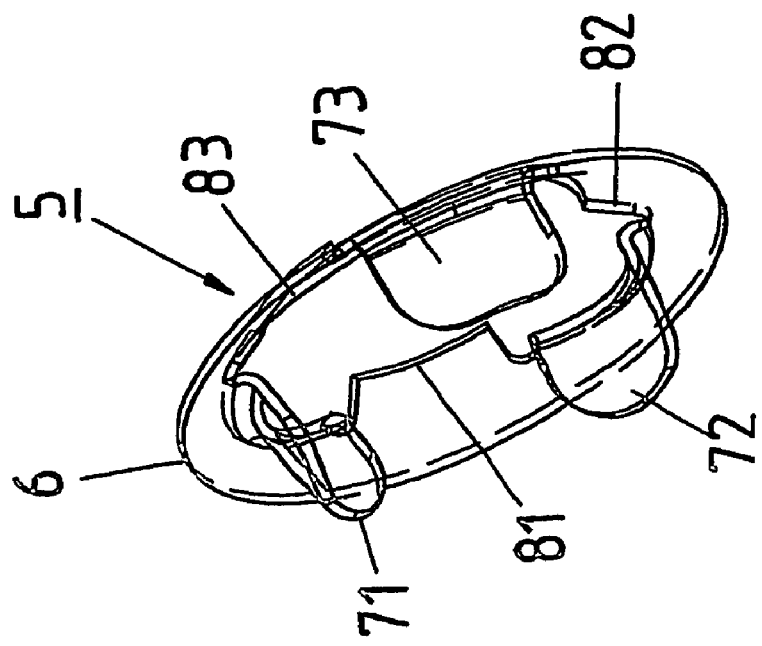

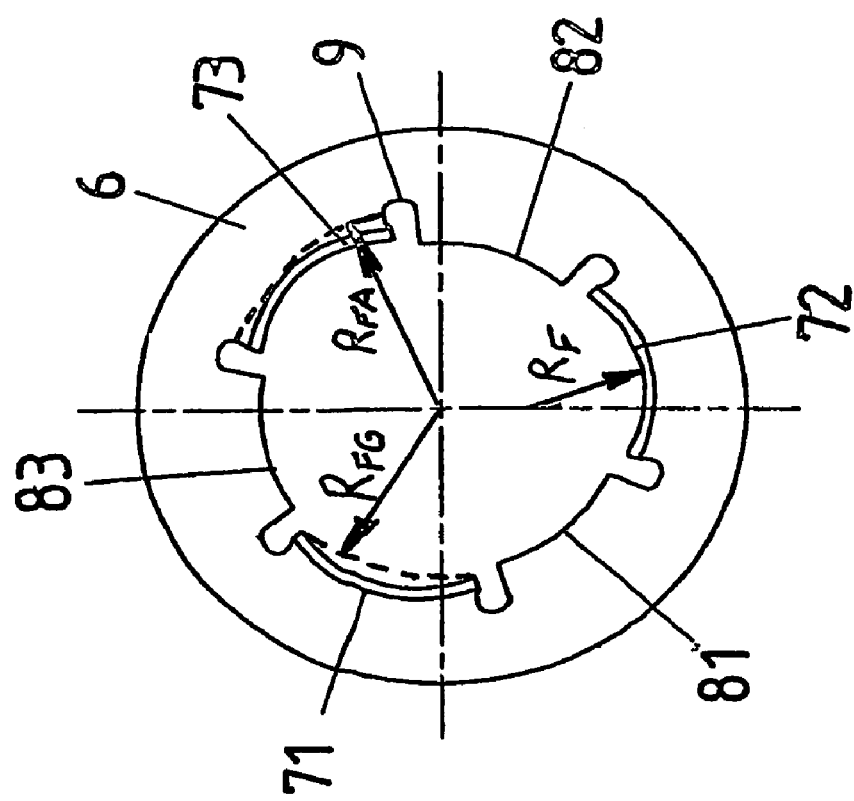
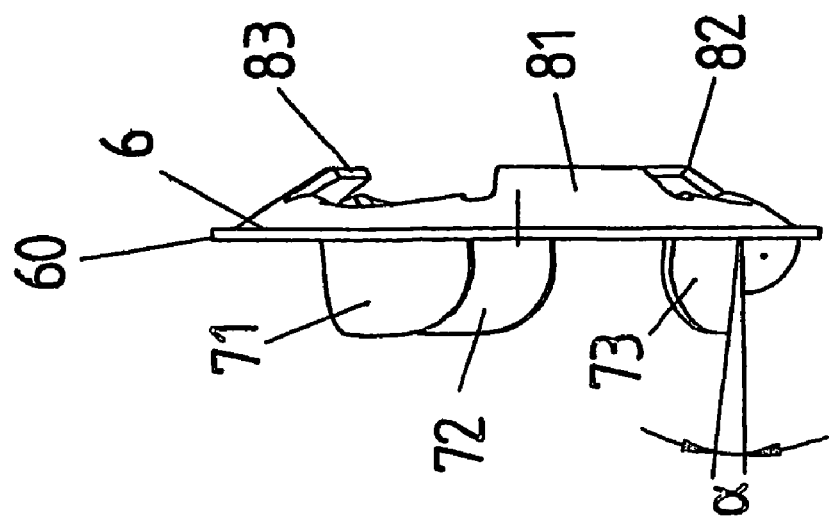

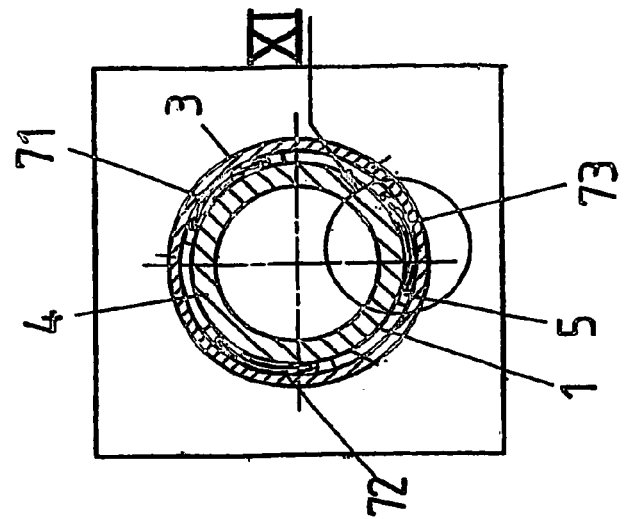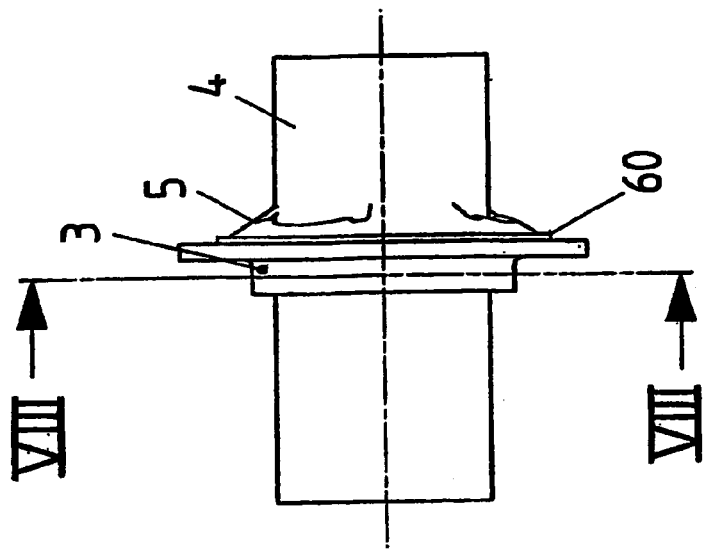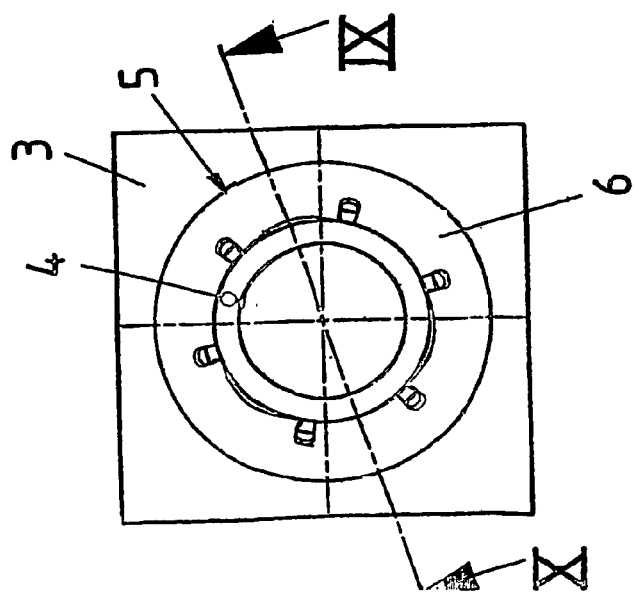

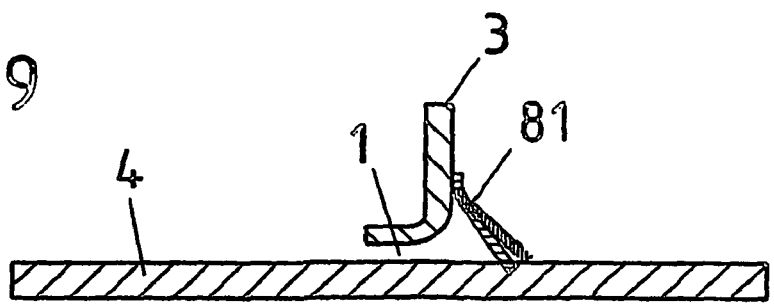
FIG 9
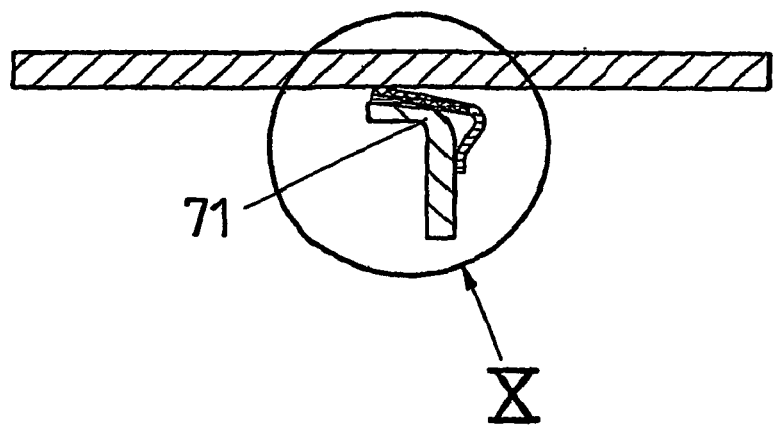
FIG 10
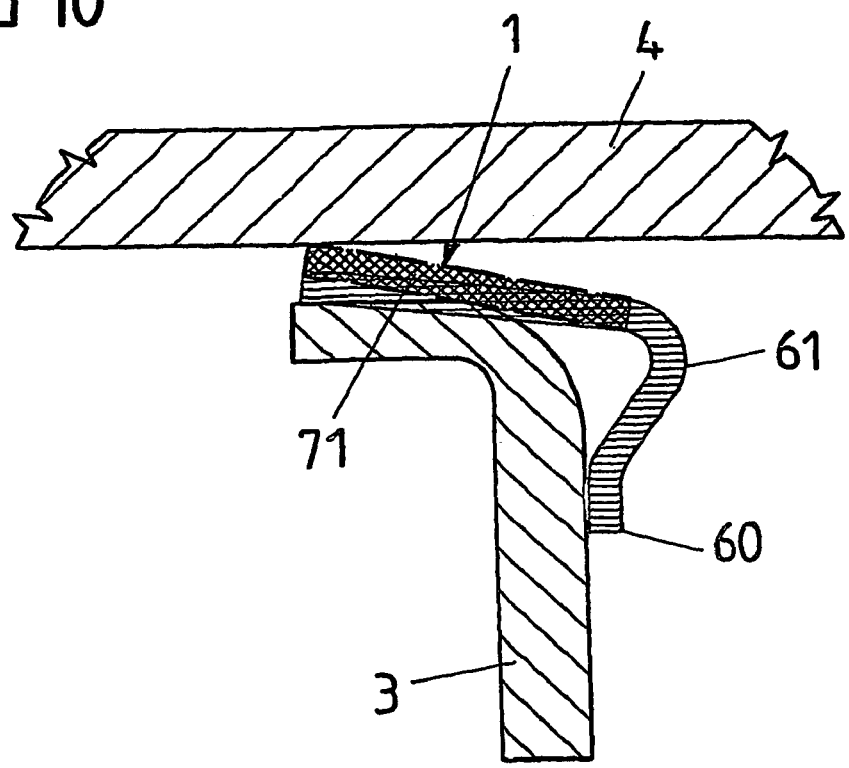

ARTICULATED JOINT

CROSS-REFERENCE TO A RELATED APPLICATION

This application is a National Phase Patent Application of International Application Number PCT/DE2004/000419, filed on Feb. 27, 2004, which claims priority of German Patent Application Number 103 11 679.6, filed on Mar. 11, 2003.

BACKGROUND

The invention relates to an articulated joint.

From German Patent No. DE 195 31 278 C1 an articulated joint is known in which a tubular sleeve and a stay are mounted rotatable with radial play on a through-bolt which serves as a bearing axle. The bearing axle is held without play inside the structural part by means of two separate bearing bushes which each surround a protruding longitudinal section of the bearing axle. The substantially cylindrical bearing bushes have for this purpose a conically inclined end region which engages in a bearing gap between the mounted structural part and the through-bolt which (gap) is widened out through a chamfer and is subject to play. The bearing bushes are each pressed by their conically inclined end region which is designed to be spring-elastic in the radial direction into the bearing gap by means of axial force action and are then pressed through the wedge action by overcoming the radial play against the outer sleeve face of the through-bolt.

From U.S. Patent Application No. US 2002/0125049A1 a seat weight measuring device is known having a bearing structure. This comprises an articulated joint with a push-in bush which has different shaped spring sections whereby the radial play of a bolt mounted in the bush is compensated.

Simple articulated joints in the form of radial rotary joints as used for example between levers of a seat height adjuster in motor vehicles, normally consist of an axially secured articulated bolt which engages through bores in bushes formed on the levers and connects these together for rotation. Sufficient minimum play must be provided between at least one bush and the bolt to allow a relative rotational movement between the interconnected levers and to ensure easy assembly between the levers and the joint.

As a result of the minimum radial play required there may result, for example through vibrations, relative radial movements between the bolt and the bush which can lead to rattling noises and thus loss of comfort. Furthermore the relative movements and resulting frequent load changes can lead to fatigue arising in the material of the bush or joint bolt. A further reduction in the play to eliminate relative radial movements is however often not possible since otherwise a press-fit arises and no or only a restricted rotational movement between the bush and joint bolt is possible in the joint.

The object of the invention is to provide a play compensation element for an articulated joint of the type mentioned at the beginning which with simple assembly of the joint and with low manufacturing costs even with wide tolerances in the joint permanently suppresses relative radial movements between the joint parts without the risk of the joint bolt or joint pipe and joint bush canting and becoming jammed.

BRIEF DESCRIPTION

According to this the joint has a preferably axially fitting play compensation element which compensates the radial play of an annular bearing gap between a joint bush and a joint bolt or joint pipe of the joint mounted rotatable in the joint bush, and has several spring sections engaging in the annular bearing gap wherein the radii of the spring sections are shorter than the radius of the annular bearing gap.

To use the play compensation element both to compensate play and to axially secure the articulated joint, at least one clamping region of the play compensation element is supported on the joint bolt or joint pipe.

The solution according to the invention provides a play compensation element for a joint which with low manufacturing costs enables a simple assembly of the joint and even with wide tolerances in the joint eliminates relative radial movements between the joint bolt or joint pipe and the joint bush without the risk of these joint parts becoming jammed. A smooth-running rotational movement between the joint bolt or joint pipe and the joint bush is thereby guaranteed.

The spring sections are formed spring-elastic both in the axial and in the radial direction so that the play compensation is guaranteed for the joint parts permanently elastically and taking into account wear factors without the risk of the joint parts canting or becoming jammed.

The play compensation element can optionally have a disc-shaped or dish-shaped base body beyond which the spring sections project and include an acute angle with the joint axis.

The radius of the spring sections of the play compensation element engaging in the annular bearing gap is measured in relation to the radius of the joint bolt or outer radius of the joint pipe so that the spring sections adjoin the joint bolt or joint pipe linearly by their contoured edge. This prevents the joint parts from becoming jammed or having difficulty in moving caused by increased friction. Furthermore the resilient contact of the play compensation element against the joint parts makes it possible to bridge wide tolerances without the risk of rattling noises occurring or the joint parts becoming wedged.

Furthermore the spring sections fitted in the annular bearing gap can bear against the joint bush with a part of their outwardly directed surface area in a region between the linear contacts of the spring sections against the joint bolt.

The spring sections fitted in the annular bearing gap are thus angled away from the base body and shaped so that as a result of their radius, which is smaller compared with the radius of the joint bolt or joint pipe, and as a result of the spring-elastic design of the spring sections both in the axial and in the radial direction they bear linearly against the joint bolt and with a flat surface area against the joint bush in a region between the linear contacts against the joint bolt.

The play compensation element preferably has at least three spring sections spread out uniformly around its periphery and consisting more particularly of shaped and tempered spring steel.

If the outer radius of the curved spring sections, in relation to the centre point of the play compensation element, is larger than or at least equal to the inner radius of the joint bush then the spring sections on insertion into the annular bearing gap are pressed inwards onto the joint bolt or joint pipe whereby a play-free resilient support is then obtained between the joint bolt or joint pipe and the joint bush.

The dish-shaped base body can with a corresponding curvature on the side of the base body opposite the spring sections undertake securing functions. The spring sections which do not protrude from the base body at a right angle but which protrude from the base body at an acute angle to the joint axis enable easy insertion of the play compensation elements into the bearing gap or a connection of the play compensation element with the joint bolt prior to its insertion into the joint bush.

The play compensation element which is equipped with clamping function is thus suitable both for the play compensation between a joint bush and a joint bolt or joint pipe and also in a wider function as an axial securing element so that additional securing of the joint for example through a flange-type closure of the joint bolt or joint pipe can be eliminated.

At least one clamping region more particularly projects over the side of the base body of the play compensation element opposite the spring sections, and bears against the joint bolt or joint pipe with force-locking and/or positive-locking engagement so that no additional axial securing of the joint is required.

The base body is preferably designed dish-shaped and has clamping regions uniformly spread out round the periphery and integrated in the base body, more particularly as web-type clamping elements.

A preferred development of the solution according to the invention is characterised in that the clamping regions are arranged between the spring sections and more particularly three spring and three clamping sections project over the one and other side of the base body in alternation around the periphery of the base body and each include a small radial cut-out section between them to balance the actions of the spring and clamping sections.

If the base or inner radius of the play compensation element, in relation to the centre point of the play compensation element, is greater than or equal to the radius of the joint bolt or outer radius of the joint pipe then the play compensation element can be easily fitted onto the joint bolt or joint pipe without any additional aids.

For flush contact with the play compensation element the base body of the play compensation element bears against an end face of the joint bush.

In the case of a dish-shaped base body the base body of the play compensation element adjoins the end face of the joint bush by a ring-shaped contact bearing face which runs parallel to the end face of the joint bush whereby a maximum radial tensioning of the spring sections is obtained in the annular bearing gap.

The one-piece play compensation element reduces the individual component costs of the joint parts which are to be connected since it alone is in a position to guarantee both the play compensation and an axial securing of the joint connection. As a result of its ability to bridge even wide tolerances it makes it possible to widen the tolerances of the joint parts for free sizing. It is thereby possible to use different diameters for the bearing partners and meet different requirements for the axial securing of the joints through different types of materials, different thicknesses of materials and different tempering stages of the play compensation element.

BRIEF DESCRIPTION OF THE DRAWINGS

The invention will now be explained in further detail with reference to an embodiment illustrated in the drawings.

FIG. 1 is a perspective view of an underneath support frame for a vehicle seat with an articulated joint between a joint pipe and seat side parts or swivel supports for a height adjustment device for the vehicle seat;

FIG. 2 is a perspective view of the play compensation element according to the invention;

FIG. 3 is a plan view of the play compensation element according to FIG. 2 from the side of the spring sections;

FIG. 4 is a side view of the play compensation element according to FIG. 2;

FIG. 5 is a plan view of the play compensation element according to FIG. 2 from the side of the clamping regions;

FIG. 6 is a plan view of the joint according to FIG. 1 with a play compensation element according to FIGS. 2 to 5;

FIG. 7 is a side view of the joint according to FIG. 6;

FIG. 8 is a section through the joint according to FIG. 7 along the line VIII-VIII;

FIG. 9 is a section through the joint according to FIG. 6 along the line IX-IX;

FIG. 10 is an enlarged view of the detail X according to FIG. 9 and

FIG. 1 shows in a perspective view an underframe for a longitudinally and vertically adjustable vehicle seat with two longitudinal guide rails 2a and 2b of a longitudinal adjusting device of the vehicle seat, each with a lower rail connected to the vehicle floor in which an upper rail is guided displaceable in the longitudinal direction.

Figure 11:
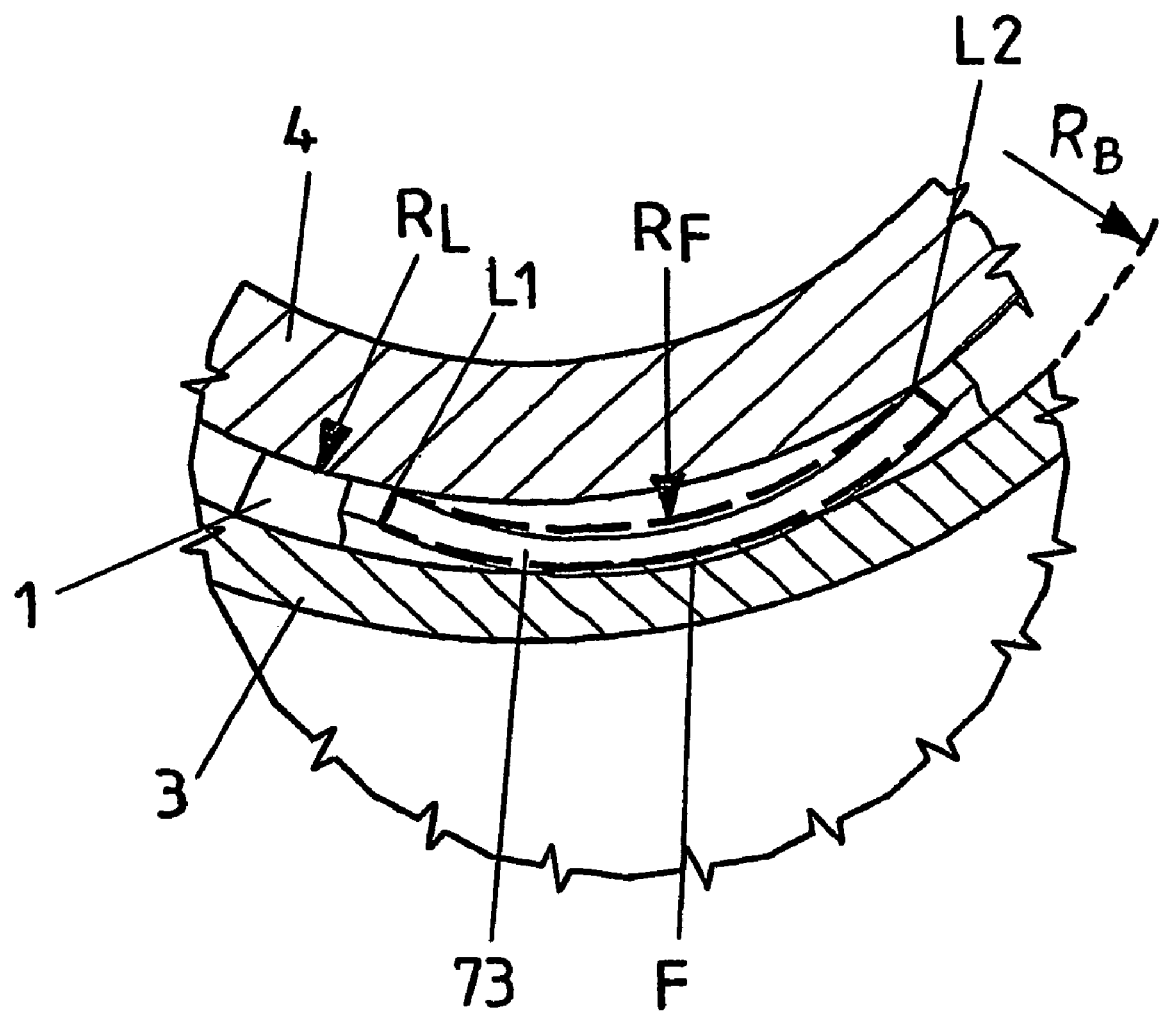
FIG. 11 is an enlarged view of the detail XI according to FIG. 8.

The rear ends of the upper rails are fitted with rear bearing blocks on which rear swivel supports 11, 12 are mounted which are connected to a cross tube whose ends are pushed through bores in the rear end of the seat side parts 3a, 3b of the vehicle seat to form an articulated joint in which the ends of the cross tube form a joint bolt or joint pipe 4, illustrated in FIGS. 2 to 11, and the bores or ports in the rear end of the seat side parts 3a, 3b form a joint bush 3.

The joint between the joint bolt or joint pipe 4 and the joint bush 3 is produced through a play compensation element 5 which in this function also serves as a securing element for securing the joint between the joint pipe 4 and the bores or ports in the seat side parts 3a, 3b forming the joint bush 3 whilst the swivel supports 11, 12 are fixedly connected to the cross tube 4a.

In order to compensate the radial tolerances of the joint pipe 4 and the joint bush 3 an annular bearing gap is formed between the two joint parts 3, 4 and is spanned by the play compensation element 5 according to the invention.

The play compensation element 5 is shown in perspective view and in different side views in FIGS. 2 to 5 and consists of a base body 6 comprising a dish-shaped flange from which three spring sections comprising bent springs 71, 72, 73 are bent round to the side of the larger diameter of the dish-shaped base body 6. On the side of the smaller diameter of the dish-shaped base body 6 three clamping regions comprising clamping springs 81, 82, 83 are angled out and protrude as tab-like webs from the base body 6. The spring sections 71, 72, 73 as well as the clamping regions 81, 82, 83 are arranged in alternation around the inner diameter of the base body 6 and are uncoupled from each other through recesses 9.

The spring sections 71, 72, 73 are corresponding to FIGS. 5 and 11 curved with a radius RF which is smaller than the outer radius RL of the joint pipe 4, and according to FIG. 4 are inclined inwards at an angle α relative to the bearing axis. They form resilient compensating sections, more particularly of spring steel which is first shaped according to the illustrations in FIGS. 2 to 4 and then tempered.

As can be seen in particular from FIG. 11 the relationship between the radii RF and RL has the effect that the spring sections 71, 72, 73 inserted in the annular bearing gap 1 bear linearly against the joint bolt 4 through their contoured edge and bear against the joint bush 3 by a part of their outwardly directed surface area in a region between the linear contacts of the spring sections against the joint bolt 4.

The outer radius RFA of the curved spring sections 71, 72, 73 in relation to the centre point of the play compensation element 5 and shown in dotted lines, i.e. the radius of a tangent placed against the curvatures, is preferably greater or at least equal to the inner radius RB of the joint bush 3 whilst the base or inner radius RFG of the play compensation element 5 in relation to the centre point of the play compensation element 5 and likewise shown in dotted lines, is larger than or equal to the radius of the joint bolt 4 or outer radius of the joint pipe 4.

Thus on the one hand the spring sections 71, 72, 73 on insertion into the annular bearing gap are pressed inwards onto the joint bolt or joint pipe 4 thereby providing a play-free resilient support between the joint bolt or joint pipe 4 and the joint bush 3, and on the other hand the play compensation element 5 can be easily pushed onto the joint bolt or joint pipe 4 without any additional aids.

If the play compensation element 5 illustrated in FIGS. 2 to 5 solely fulfils a play compensation function then the clamping regions 81, 82, 83 can be eliminated if the play compensation element 5 is mounted by way of example between two flanges of the joint parts of the joint and only bridges the annular bearing gap provided for the tolerance compensation of the joint parts.

If the play compensation element 5 serves both for compensating play and for securing the joint then it is preferably formed in the manner illustrated in FIGS. 2 to 5, i.e. with additional clamping regions 81, 82, 83 which in this embodiment are formed as tongue-like webs on bending the spring sections 71, 72, 73 round to the opposite side of the base body 6. The outer circumference of the base body 6 forms a flange-type contact bearing area 60 which when connecting the joint parts comes to bear against the end face 30 of the joint bush 3 according to FIGS. 7 and 9.

FIGS. 6 to 8 show the joint between the cross tube 4a formed as the joint bolt 4, and the bore in the seat side parts 3a, 3b forming the joint bush 3 according to FIG. 1 in conjunction with the play compensation element 5 in a side end view (FIG. 6), a side view (FIG. 7) and in a sectional view in FIG. 8 along the line VIII-VIII according to FIG. 7.

In order to make and secure the joint as well as to compensate play and bridge the annular bearing gap 1 formed between the joint bolt 4 and the joint bush 3 the play compensation element 5 is fitted onto the joint bolt 4 and then pushed by its spring sections 71, 72, 73 into the annular bearing gap 1 which is formed between the joint bolt 4 and the joint bush 3. If the ring-shaped flange 60 of the base body 6 of the play compensation element 5 comes to bear against the end face 30 of the joint bush 3 then the spring sections 71, 72, 73 are tensioned with maximum load between the surfaces of the joint bolt 4 and the joint bush 3.

FIG. 9 shows on an enlarged detailed scale a sectional view through the joint according to the line IX-IX of FIG. 6 and shows the annular bearing gap 1 which is formed between the joint bolt 4 and the joint bush 3 and which is bridged by the spring section 71. FIG. 9 clearly shows the clamping section 81 wedged by its bent end edge against the surface of the joint bolt 4.

FIG. 10 shows an enlarged view of the spring section 71 which bridges the annular bearing gap 1 and which during insertion of the play compensation element 5 into the annular bearing gap 1 forms as a result of its spring elasticity linear contacts L1, L2 against the joint bolt 4 as well as a flat surface area contact F against the joint bush 3. As a result of the curvature and spring-elastic design of the spring sections 71, 72, 73 the radial play between the joint bolt 4 and the joint bush 3 is completely compensated.

FIG. 11 shows in an enlarged detailed view the area XI according to FIG. 8 and shows the spring section 73 which compensates the annular bearing gap 1 between the joint bolt 4 and the joint bush 3 and which as a result of its spring elasticity forms linear contacts L1, L2 against the joint bolt 4 as well as a flat surface area contact F against the joint bush 3. FIG. 3 shows at the same time that the linear contacts L1, L2 against the joint bolt 4 arise through the radius RF of the spring section 73 which is smaller compared to the radius RL of the annular bearing gap 1. This configuration of the spring sections 71, 72, 73 in conjunction with their spring elasticity is required to bridge even wide tolerances without resulting in jamming between the joint bolt 4 and joint bush 3. This is important for example in the case of FIG. 1 so that a restricted swivel angle of the cross tube 4a relative to the seat side parts 3a, 3b is guaranteed.

When producing the joint it involves two superposed deformations of the spring sections 71, 72, 73, namely pressing down in the sense of a resilient inward swivel movement and pressing flat in the sense of an elastic deformation of the curved region of the spring sections 71, 72, 73 in the direction of the increasing radius RF of the spring sections 71, 72, 73 when inserting the play compensation element 5 into the annular bearing gap 1.

The invention claimed is:

1. An articulated joint comprising:
 a joint bushing comprising an end face having inner and outer sides having a bore longitudinally extending between the inner and outer sides and having an inner diameter;
 a joint pipe comprising an outer surface along a longitudinal length of the joint pipe having an outer diameter smaller than the inner diameter of the bore to define an annular bearing gap between the outer surface of the joint pipe and the bore when the joint pipe is longitudinally inserted into and rotatably mounted with radial play in the bore;
 a unitarily formed play compensation element for compensating the radial play between the joint pipe and the joint bushing, the play compensation element comprising:
 a base body comprising an annular flange having a peripheral contact surface bearing against the outer side of the end face surrounding the bore and having a first side facing the joint bushing and a second side axially opposite to the first side, the flange having an opening longitudinally extending between the first and second sides of the base body and having an edge configured for receiving the joint pipe;
 a plurality of curved tab-shaped clamping springs circumferentially spaced around and radially inwardly extending from the edge of the opening, the clamping springs axially protruding from the second side of the base body, an outer surface of each clamping spring engaging the bore and an inner surface of each clamping spring engaging the outer surface of the joint pipe; and
 a plurality of tongue-shaped bent springs circumferentially spaced around the edge of the opening and arranged between the clamping springs, the bent springs radially inwardly extending from the edge of the opening and axially protruding from the second side of the base body, an inner surface of each bent spring engaging the outer surface of the joint pipe to axially secure the joint pipe with the joint bushing;
 wherein the bent springs are formed by bending the bent springs around from the second side of the base body through said opening of the base body to the first side of the base body such that a first portion of each of the bent springs protrudes from the edge of the opening on the second side of the base body and axially extends away from the base body, a bent portion of the bent spring extends from the first portion and bends radially inward, and a second portion of the bent spring axially extends from the bent portion toward the base body and through the opening to protrude from the first side of the base body.

2. The articulated joint according to claim 1, wherein the second portion of each of the bent springs projects through the opening making an acute angle with the longitudinal length of the joint pipe.

3. The articulated joint according to claim 1, wherein each bent spring comprises an inner contoured edge which bears against the joint pipe linearly.

4. The articulated joint according to claim 1, wherein the play compensation element has at least three clamping springs spread out uniformly around the edge of the opening.

5. The articulated joint according to claim 1, wherein the bent springs comprise a shaped and tempered spring steel.

6. The articulated joint according to claim 1, wherein an outer radius of the clamping springs in relation to a center point of the play compensation element is larger than or equal to an inner radius of the bore.

7. The articulated joint according to claim 1, wherein the flange is dish-shaped and the bent springs are spread uniformly around the edge of the opening.

8. The articulated joint according to claim 1, wherein each clamping spring comprises an inner curvature which is non-concentric relative to a center point of the joint pipe.

9. The articulated joint according to claim 8, wherein the curvatures of the clamping springs are non-concentric relative to each other at least before the clamping springs engage in the annular bearing gap.

10. The articulated joint according to claim 1, wherein the play compensation element has three clamping springs and three bent springs and wherein the clamping springs and bent springs are arranged around the edge of the opening in an alternating spread out arrangement and adjacent springs are separated from each other by a small radial cut-out section in the flange to uncouple actions of the clamping springs and the bent springs.

* * * * *